United States Patent
Lefever et al.

(10) Patent No.: US 11,225,124 B2
(45) Date of Patent: Jan. 18, 2022

(54) VENTILATION VALVE FOR A VEHICLE

(71) Applicant: ILLINOIS TOOL WORKS INC., Glenview, IL (US)

(72) Inventors: Andrew Lefever, Remering (FR); Stefan Jatzke, Ebertsheim (DE); Hubert Loewe, Weselberg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 162 days.

(21) Appl. No.: 16/194,477

(22) Filed: Nov. 19, 2018

(65) Prior Publication Data
US 2019/0152296 A1    May 23, 2019

(30) Foreign Application Priority Data
Nov. 22, 2017    (DE) ................... 10 2017 127 563.0

(51) Int. Cl.
*B60H 1/24* (2006.01)
*B60H 1/00* (2006.01)

(52) U.S. Cl.
CPC ....... *B60H 1/249* (2013.01); *B60H 2001/006* (2013.01)

(58) Field of Classification Search
CPC .......................... B60H 1/249; B60H 2001/006
USPC ............................................ 454/162
See application file for complete search history.

(56) References Cited

U.S. PATENT DOCUMENTS

| | | | | |
|---|---|---|---|---|
| 1,359,558 | A * | 11/1920 | Wine | B61D 27/009 49/90.1 |
| 2,750,868 | A * | 6/1956 | Mieczkowski | A01K 1/0064 454/343 |
| 5,277,658 | A * | 1/1994 | Goettl | F24F 11/043 137/512.1 |
| 6,475,078 | B1 * | 11/2002 | Borcherding | A01K 1/0064 454/259 |
| 8,328,609 | B2 | 12/2012 | Schneider | |
| 8,550,888 | B2 * | 10/2013 | Hildreth, Jr. | F24F 13/1426 454/273 |
| 9,759,439 | B2 * | 9/2017 | Uhlenbusch | G10K 11/168 |
| 2005/0189024 | A1 | 9/2005 | Dippel | |
| 2009/0280736 | A1 | 11/2009 | Schneider | |
| 2015/0133042 | A1 * | 5/2015 | Pearce | F24F 13/08 454/184 |
| 2016/0263967 | A1 * | 9/2016 | Schaake | F16K 1/2261 |
| 2017/0158021 | A1 * | 6/2017 | Iacovoni | B60H 1/00857 |

FOREIGN PATENT DOCUMENTS

| | | |
|---|---|---|
| DE | 20316536 | 4/2004 |
| DE | 102006056868 | 6/2008 |
| EP | 0728606 | 1/1996 |

* cited by examiner

*Primary Examiner* — Allen R. B. Schult
(74) *Attorney, Agent, or Firm* — Thompson Hine LLP (57) ABSTRACT

A ventilation valve for ventilating the interior of a vehicle includes a valve frame with at least one through opening, and also at least one ventilation flap which is mounted on the valve frame and is pivotable between a closed position and an open position, wherein the at least one ventilation flap closes the at least one through opening in the closed position and opens up the at least one through opening in the open position. A resetting feature is provided for pivoting the at least one ventilation flap back out of the open position into the closed position.

9 Claims, 6 Drawing Sheets

VENTILATION VALVE FOR A VEHICLE

TECHNICAL FIELD

The invention relates to a ventilation valve for ventilating the interior of a vehicle, comprising a valve frame with at least one through opening, and also at least one ventilation flap which is mounted on the valve frame and is pivotable between a closed position and an open position, wherein the at least one ventilation flap closes the at least one through opening in the closed position and opens up the at least one through opening in the open position.

BACKGROUND

Ventilation valves of the above-mentioned type serve for removing outgoing air from the interior of a vehicle in the event of a positive pressure in relation to the vehicle surroundings occurring in the vehicle interior. Air supplied to the vehicle interior, for example via an aeration system, can thus be removed. In particular, a positive pressure occurring suddenly in the vehicle interior—caused, for example, by the closing of a vehicle door or by the triggering or an airbag—can also be compensated for by the excess air passing through the ventilation valve out of the vehicle interior to the outside. If the pressure in the vehicle interior does not exceed or only slightly exceeds the external pressure, the ventilation flap lies against the valve frame and therefore closes the valve. The intention is thereby to prevent impurities, such as, for example, vehicle exhaust gases, and also noise from entering the vehicle interior.

The ventilation flaps of known ventilation valves are customarily configured flexibly and customarily consist in particular of rubber tabs (for example of NBR), of ethylene-propylene-diene rubber (EPDM), of thermoplastic elastomers (TPE) or of PET films, and are fastened to the valve frame in an elastically deformable manner. Ventilation flaps of this type are deflected here not by pivoting, but rather by deformation, of the flexible flaps. Such ventilation flaps are arranged in such a manner that they are held in the closed position by gravity. By means of a positive pressure occurring in the vehicle interior, the ventilation flaps are deformed counter to gravity, and the through openings are therefore opened up. Ventilation valves of this type are known, for example, from DE 10 2006 056 868 A1 and EP 0 728 606 B1.

Ventilation valves are customarily arranged in the vehicle in the rear region in order to permit fresh air which is supplied by the aeration system arranged in the front of the vehicle to flow through the entire vehicle. In particular, ventilation valves are arranged for visual reasons in the vicinity of the rear wheels of the vehicle since they can thus be simply covered by the rear skirt. However, this arrangement has the disadvantage that, at least in the open position of the ventilation flap, vehicle noises, for example by means of the driving noise of the wheels and by means of the exhaust gas system, and exhaust gases may enter the vehicle interior. An arrangement of the ventilation valve at another position in the vehicle generally fails by the fact that the ventilation valve always has to be arranged in such a manner that the ventilation flap can be held in the closed position by gravity.

DE 203 16 536 U1 describes a nonreturn valve for ventilating a vehicle interior, with a deformable valve flap composed of an elastically resilient material, wherein the valve flap is bent over at an end connected to a valve seat in such a manner that a resetting force loading the valve flap against the valve seat is produced. The valve flap is thus intended to be prestressed into the closed position by means of its own elasticity, and therefore the valve flap is also set back into the closed position counter to gravity. The valve is therefore intended to be able to be used in any desired installed position. However, a valve flap of this type has the disadvantage that the resetting force of the flap greatly decreases over time because of fatigue phenomena of the material, which results in leakage of the ventilation valve.

SUMMARY

The invention is therefore based on the object of providing a ventilation valve for a vehicle which, while reliably ventilating the vehicle interior, better prevents the entry of impurities and noise into the vehicle interior.

The invention achieves the object by a ventilation valve as claimed in claim 1. Advantageous refinements are found in the dependent claims, the description and the figures.

According to the invention, the ventilation valve explained at the beginning comprises resetting means for pivoting the at least one ventilation flap back out of the open position into the closed position.

As explained at the beginning, the ventilation valve serves for letting air out of a vehicle interior, in particular in the event of a positive pressure in relation to the vehicle surroundings prevailing in the vehicle interior. The ventilation valve can be accommodated, for example, in a body of a vehicle via the valve frame. The valve frame can also be connected to a mounting plate which, in turn, is connected to the body of the vehicle. The ventilation valve has one or more through openings which can each be closed or opened up by a ventilation flap. For this purpose, the at least one ventilation flap is mounted pivotably on the valve frame, for example via a hinge, in particular by means of a film hinge. The hinge can be composed of a softer material or can be covered with a softer material than the material of the valve frame or than the material of the ventilation flap, and therefore a damped pivoting movement of the at least one ventilation flap is made possible. In addition, the pivoting movement therefore takes place in a substantially noise-free manner. However, the hinge can also be composed of the same material as the ventilation flap.

According to the invention, resetting means are provided which pivot the at least one ventilation flap back into the closed position. After the at least one ventilation flap is pivoted into the open position, the resetting means bring about pivoting of same back into the closed position. The resetting means therefore exert a resetting force on the at least one ventilation flap. Said resetting force is selected in such a manner that, in the event of a predetermined air pressure occurring in the vehicle interior, said air pressure overcomes the resetting force and the at least one ventilation flap is deflected into the open position. By suitable adjustment of the resetting force, said air pressure limit can be adjusted in a targeted manner. The at least one ventilation flap can be moved—actively or passively—into the closed position, for example can be prestressed into the closed position, as will also be explained later.

The invention is based on the finding that known ventilation valves in particular therefore allow vehicle noises and impurities, such as exhaust gases, to enter the vehicle interior since the flaps open upward in the installed state. Air emerging from the ventilation valve is therefore conducted substantially downward. By this means, the direct path for sound and dirt from parts located below the valve, such as, for example, the tires or the exhaust gas system, into the vehicle interior is made possible since sound and dirt can rise upward and penetrate the at least one through opening. The resetting means according to the invention permit a flexible arrangement of the ventilation valve in any desired installed position in the vehicle irrespective of the direction of gravity. In particular, the ventilation valve according to the invention can be arranged in such a manner that the at least one ventilation flap opens in the direction of gravity and not counter to the direction of gravity as in the prior art. The at least one ventilation flap of the ventilation valve explained at the beginning can therefore in particular be mounted pivotably on the valve frame in such a manner that, in an installed state of the ventilation valve in the vehicle, the at least one ventilation flap opens in the direction of gravity and closes counter to the direction of gravity, wherein the resetting means pivot the at least one ventilation flap back counter to gravity from the open position into the closed position. By this means, the impurities and noises mentioned can be kept away by the ventilation flaps themselves. In addition, the air flowing out of the ventilation valve then—depending on the opening angle of the at least one ventilation flap—escapes substantially upward in a similar direction as the rising exhaust gases and therefore transports the exhaust gases away from the at least one through opening.

In contrast to the above-explained prior art, a resetting force for adjusting the at least one ventilation flap back into the closed position is not produced according to the invention by the fact that a flexible flap is pretensioned on the basis of its own elasticity into the closed position. Instead, resetting means are provided which are formed in particular separately from the at least one ventilation flap and pivot the at least one ventilation flap preferably without deformation. According to the invention, the opening and closing of the ventilation valve consequently take place by pivoting about a pivot axis, with the resetting means always ensuring that the at least one ventilation flap is pivoted back into the closed position. Material fatigue phenomena, in particular of the ventilation flaps, are thereby avoided or at least greatly reduced. The ventilation flaps therefore still close reliably even after a long use time and thus increase the tightness and service life of the ventilation valve.

According to a preferred refinement, the resetting means are designed to pivot the at least one ventilation flap back into the closed position without elastic deformation. The at least one ventilation flap can correspondingly also be completely pivoted into the open position without elastic deformation, for example by means of a positive pressure prevailing in the vehicle interior. As explained above, this refinement has the advantage that material fatigue phenomena in the ventilation flap can be reduced and therefore particularly high tightness of the ventilation valve can be ensured over a relatively long period of time. In addition, the air throughput through the at least one through opening of the ventilation valve can be increased. This is because, in the case of the ventilation valve according to the invention, the at least one through opening does not have to be traversed—as in the prior art—with ribs. Said ribs serve in the prior art to prevent deformation of the elastic valve flaps in the direction of the vehicle interior, i.e. counter to their designated direction of deformation. Since the at least one ventilation flap according to the invention can be moved by the resetting means without elastic deformation, such deformation does not occur in the direction of the vehicle interior. The ribs can therefore be dispensed with, which increases the opening cross section of the at least one through opening and therefore permits a higher air throughput. For example, for this purpose, the at least one ventilation flap can have greater rigidity than the elastic ventilation flaps known from the prior art. Movement of the at least one ventilation flap without deformation means here that the movement of the ventilation flap is not produced by deformation and also in particular does not result in any deformation of the ventilation flap. However, it is not impossible here that, at least in the event of maximum deflection of the ventilation flap in the open position, a slight deformation of the ventilation flap may occur if there is a sufficient action of force. Such a slight deformation may also occur when the closed position is reached, i.e. when the ventilation flap is in contact with the valve frame.

According to one refinement, the resetting means comprise a counterweight for the gravity-induced pivoting of the at least one ventilation flap back into the closed position. Consequently, the at least one ventilation flap connected pivotably to the valve frame can be held in the closed position via a counterweight. If, owing to a positive pressure prevailing in a vehicle interior, the at least one ventilation flap is now deflected into the open position, when the positive pressure decreases the ventilation flap is set back into the closed position by the counterweight on the basis of gravity. With such a counterweight, a passive, gravity-induced resetting of the at least one ventilation flap into the closed position is made possible. The counterweight here also in particular balances the weight force of the at least one ventilation flap.

According to one refinement, the resetting means comprise a spring for the spring-force-induced pivoting of the at least one ventilation flap back into the closed position. The at least one ventilation flap can therefore be prestressed into the closed position by one or more springs. If a plurality of ventilation flaps are provided, in particular each of the ventilation flaps can be prestressed into the closed position by a dedicated spring. After the at least one ventilation flap is deflected into the open position, resetting into the closed position therefore takes place. This also involves a passive resetting mechanism. In this case, the at least one ventilation flap is deflected when the spring force exerted on the ventilation flap by the spring is overcome. By appropriate selection of the spring force, opening of the ventilation valve in the event of a corresponding positive pressure prevailing in the vehicle interior can be achieved. The use of such a spring permits a particularly large degree of freedom in the positioning of the ventilation valve in the vehicle since the resetting takes place irrespective of the direction of gravity. In addition, an above-explained counterweight can also be provided.

According to a further refinement, the resetting means comprise a drive which is designed to pivot the at least one ventilation flap back into the closed position. According to this refinement, an in particular electric, for example electromechanical or electromagnetic, drive can be provided which acts on the at least one ventilation flap. In addition, passive resetting means, such as the explained counterweight or the explained spring, can also be provided. In particular, instead of acting directly on the at least one ventilation flap, the drive can also act on the passive resetting means. Such a drive also permits movement of the at least one ventilation flap without elastic deformation of same. In particular, with such a drive, the at least one ventilation flap can be moved at a different speed. The effect which can be achieved with a particularly slow movement of the at least one ventilation flap back into the closed position is that the ventilation flap comes gradually into contact with the valve frame and therefore no audible striking noise upon contact of the ventilation flap with the valve frame arises.

According to a further refinement, the resetting means comprise a drive which is designed to pivot the at least one ventilation flap into the open position. In particular, a drive can be provided which is designed to adjust the at least one ventilation flap into the open position and into the closed position. According to this refinement, the ventilation valve can consequently also be opened by means of the drive. The drive can act here counter to the resetting force of possibly provided passive resetting means, such as, for example, a counterweight or a spring. With such a drive, any desired opening angle of the at least one ventilation flap can be set and maintained, which permits a defined air throughput through the vehicle.

According to a further refinement, the drive is designed to pivot the at least one ventilation flap in a manner depending on an operating parameter of the vehicle, for example in a manner depending on an air pressure prevailing in the vehicle interior. The drive can be designed here in particular to pivot the at least one ventilation flap on the basis of the measurement values of at least one pressure sensor. Consequently, one or more pressure sensors can be arranged in the vehicle interior in order to determine the air pressure prevailing in the vehicle interior. Pressure sensors of this type are frequently present in any case in the vehicle. Other sensors can also be used, for example sensors provided in connection with the triggering of an airbag. The necessity of opening the ventilation flap can also be concluded on the basis of the information transmitted by sensors of this type. Depending on the operating parameter or the operating parameters, for example the air pressure, the drive can pivot the at least one ventilation flap into the open position and/or the closed position. Consequently, depending on the prevailing operating parameters, in particular depending on the air pressure prevailing in the vehicle interior, the ventilation flap can be actively opened and actively closed, and also in particular can be held in a desired opening position.

According to a further refinement, the at least one ventilation flap has a flap body and a sealing edge surrounding the flap body, wherein the flap body has a greater rigidity than the sealing edge. The stiffer flap body ensures sufficiently high stability of the at least one ventilation flap, while the less stiff sealing edge permits good sealing in relation to the valve frame in the closed position. In particular, the stiffer flap body of the at least one ventilation flap can provide sufficient stability in order to prevent deformation during the movement of the ventilation flap into the closed position and/or the open position. Nevertheless, the softer sealing edge permits reliable sealing. Also on account of the softer sealing edge, during the movement of the at least one ventilation flap into the closed position damped contact of the ventilation flap with the valve frame can take place, which leads to particularly low impact noises.

According to one refinement, the at least one ventilation flap is produced in a 2-component injection molding process, wherein the flap body is composed of a harder material than the sealing edge. According to this refinement, the different rigidities for flap body and sealing edge are consequently achieved by a corresponding selection of the material. The at least one ventilation flap is manufactured here in particular from plastic, i.e. is produced in a 2-component plastics injection molding process.

According to an alternative refinement, the at least one ventilation flap is produced in a 1-component injection molding process, wherein the sealing edge has a smaller material thickness than the flap body, and/or wherein the sealing edge has a geometrical shape reducing the rigidity. The different rigidities for flap body and sealing edge are not achieved in this case by the selection of the material, but rather by the geometry of flap body and sealing edge. For example, the sealing edge can have a lower material strength than the flap body. The sealing edge because of its geometrical shape can also have a lower rigidity than the flap body, with, for example, a curved, wavy shape being possible. Such a shape or lower material thickness of the sealing edge leads to a lower rigidity despite the same selection of the material as for the flap body. In particular, an abovementioned hinge for the pivotable mounting of the at least one ventilation flap can also be produced together with the entire ventilation flap in the 1-component injection molding process. However, it is also not impossible in this refinement that, at least when the ventilation flap is maximally deflected in the open position, a slight deformation of the ventilation flap may occur in the event of a sufficient action of force. Also when the closed position is reached, i.e. when there is contact of the ventilation flap with the valve frame, such a slight deformation may occur.

According to one refinement, the at least one ventilation flap is provided with acoustic insulating material. For example, the at least one ventilation flap can be provided with the insulating material on a side facing away from the valve frame. A noise reduction can thereby be achieved. According to another refinement, the at least one ventilation flap is composed of a foamed material. Noise reduction can thereby also be achieved.

A vehicle according to the invention comprises an above-described ventilation valve, wherein the at least one ventilation flap is mounted pivotably on the valve frame in such a manner that, in an installed state of the ventilation valve in the vehicle, the at least one ventilation flap opens in the direction of gravity and closes counter to the direction of gravity. Consequently, the at least one ventilation flap opens in particular downward and closes upward in the opposite direction. As already explained above, the resetting means according to the invention permit an extremely flexible arrangement of the ventilation valve in the vehicle; in particular, the ventilation valve can be arranged here in such a manner that the at least one ventilation flap opens in the direction of gravity. In the direction of gravity means here that the ventilation flap is mounted in such a manner that the ventilation flap would pass into the open position in a gravity-induced manner if the resetting means were not present. In the installed state of the ventilation valve in the vehicle, when a positive pressure in relation to the surroundings prevails in the vehicle interior, the at least one ventilation flap pivots into the open position. The resetting means set back the at least one ventilation flap counter to gravity. The ventilation valve can therefore basically be arranged in any desired installed position in the vehicle, for example in a trunk floor. The entry of noise and impurities is thereby also reduced. However, on account of the resetting means according to the invention, the movement of the at least one ventilation flap takes place here substantially without deformation, as explained above.

According to one refinement, at least one pressure sensor for measuring an air pressure prevailing in the vehicle interior is provided, wherein the ventilation valve comprises a drive which is designed to pivot the at least one ventilation flap into the open position and/or into the closed position in a manner depending on the air pressure. The vehicle can therefore have one or more pressure sensors which determine the air pressure prevailing in the vehicle interior. On the basis of the air pressure determined, a drive can move the at least one ventilation flap. The drive can also be designed here in particular to pivot the at least one ventilation flap into the closed position depending on the air pressure. With regard to further details, reference is made to the above explanations regarding the ventilation valve.

BRIEF DESCRIPTION OF THE DRAWINGS

An exemplary embodiment of the invention will be explained in more detail below with reference to figures, in which, schematically.

Unless stated otherwise, the same reference signs denote identical objects. For clarity reasons, all reference signs are not shown in all of the figures.

DETAILED DESCRIPTION

FIGS. 1 to 8 illustrate an exemplary embodiment of the ventilation valve according to the invention.

The ventilation valve 10 comprises a mounting plate 12, into which a valve frame 14 is embedded. The valve frame 14 is fastened here to the mounting plate 12 via latching projections 15 and a contact edge 17. The contact edge 17 at the same time forms a seal with respect to the mounting plate 12. Four through openings 16 are formed in the valve frame 14 and are spaced apart from one another by means of webs 19. Ventilation flaps 18 are mounted on the webs 19, wherein, for this purpose, pivot mountings 28 of the ventilation flaps 18 engage in pivot bearing receptacles 30 of the webs 19. The ventilation flaps 18 can therefore be pivoted between a closed position, which is illustrated in FIGS. 1, 3, 5 and 8 and in which they cover the through openings 16, and an open position, which is illustrated in FIGS. 2, 4, 6 and 9 and in which they open up the through openings 16. The four ventilation flaps 18 are each pivoted here about axes which extend along the webs 19. The ventilation flaps 18 are preferably produced from plastic in a 2-component injection molding process and each comprise a flap body 18.1 and a sealing edge 18.2, wherein the flap body 18.1 preferably has greater rigidity than the sealing edge 18.2. In the closed position, the softer sealing edge 18.2 can therefore lie against the valve frame 14 in a particularly readily sealing manner. The harder flap body provides each of the ventilation flaps with a high degree of stability and therefore prevents deformation.

Figure 1:
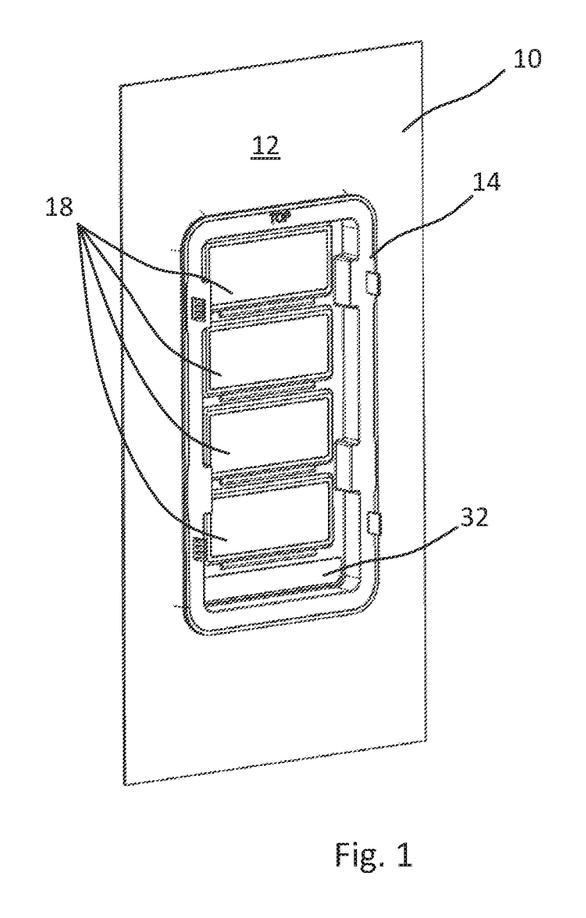
FIG. 1 shows a ventilation valve according to the invention in a front view with closed ventilation flaps.
Figure 2:
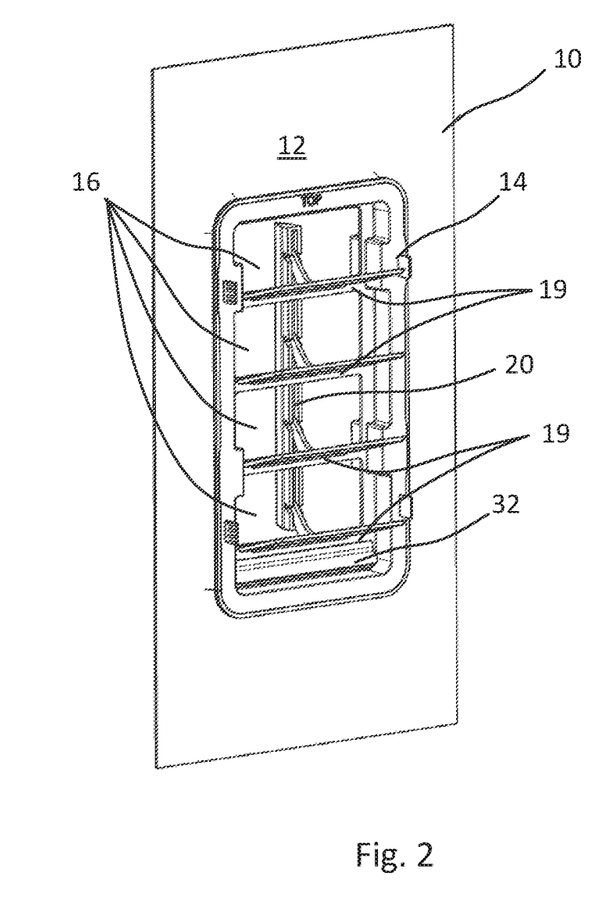
FIG. 2 shows the ventilation valve from FIG. 1 with open ventilation flaps.
Figure 3:
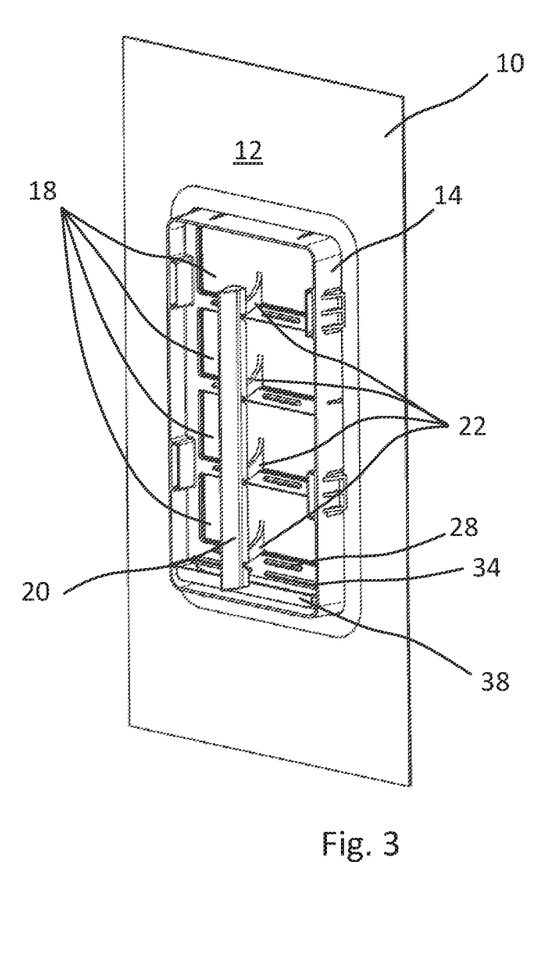
FIG. 3 shows the ventilation valve from FIG. 1 in a rear view.
Figure 4:
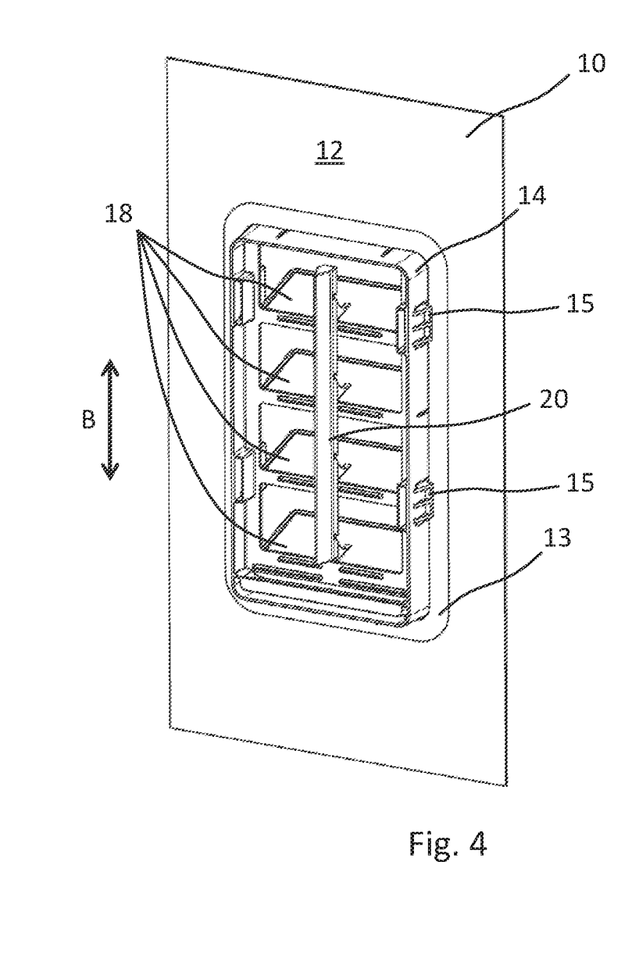
FIG. 4 shows the ventilation valve from FIG. 2 in a rear view.
Figure 5:
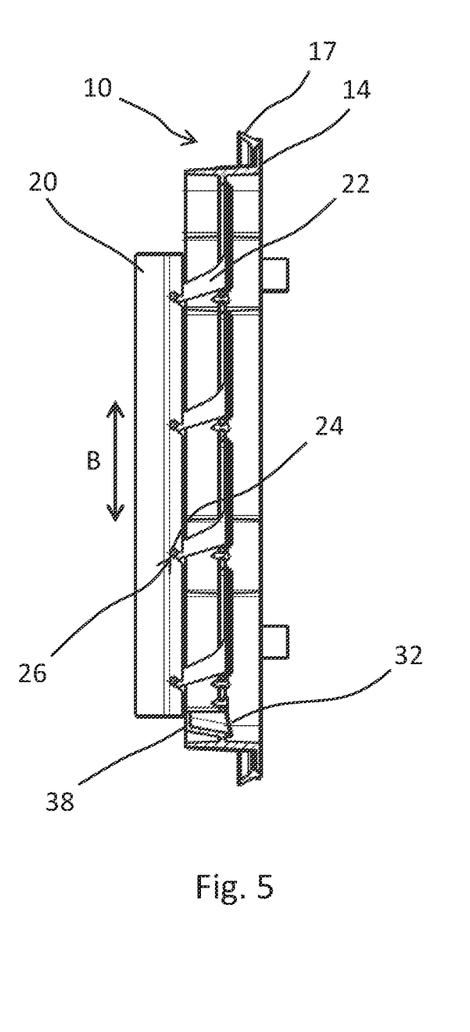
FIG. 5 shows the ventilation valve from FIG. 1 in a lateral sectional view.
Figure 6:
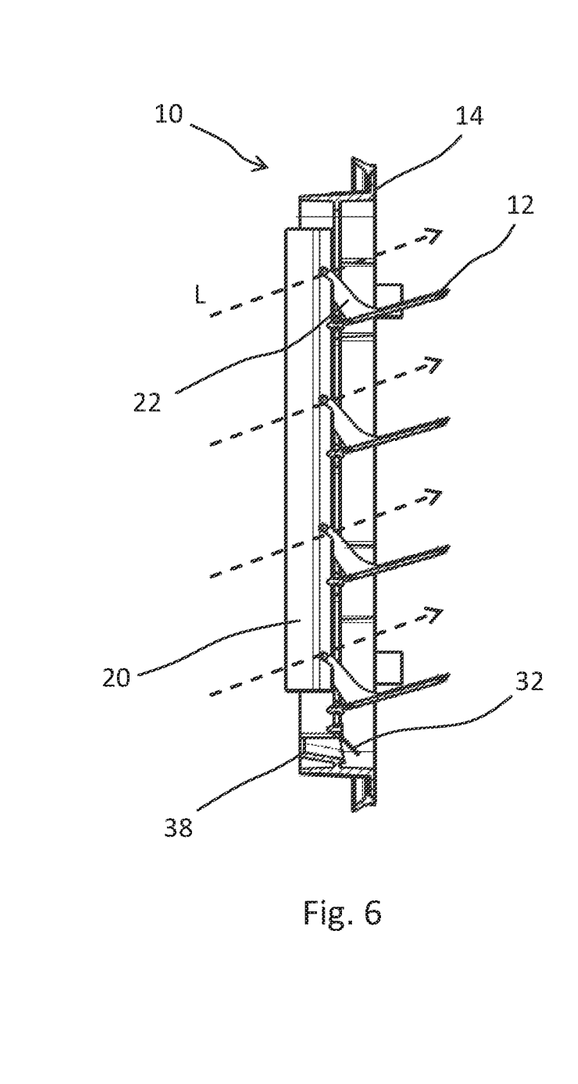
FIG. 6 shows the ventilation valve from FIG. 2 in a lateral sectional view.
Figure 7:
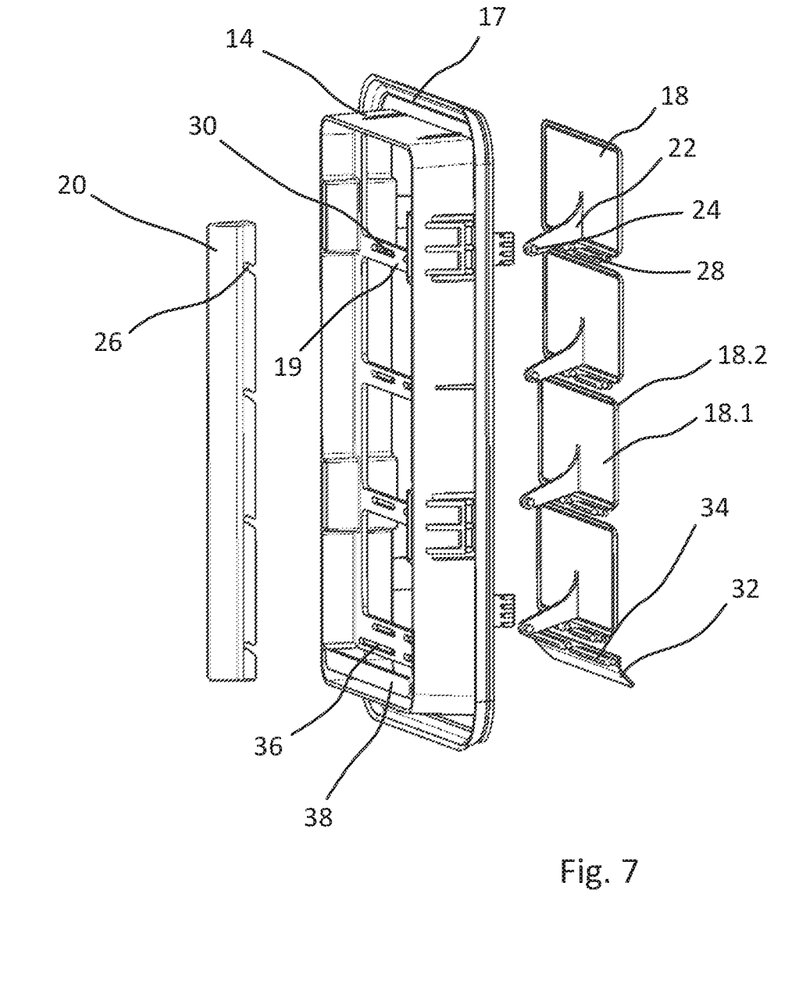
FIG. 7 shows an exploded illustration of the ventilation valve from FIG. 1.
Figure 8:
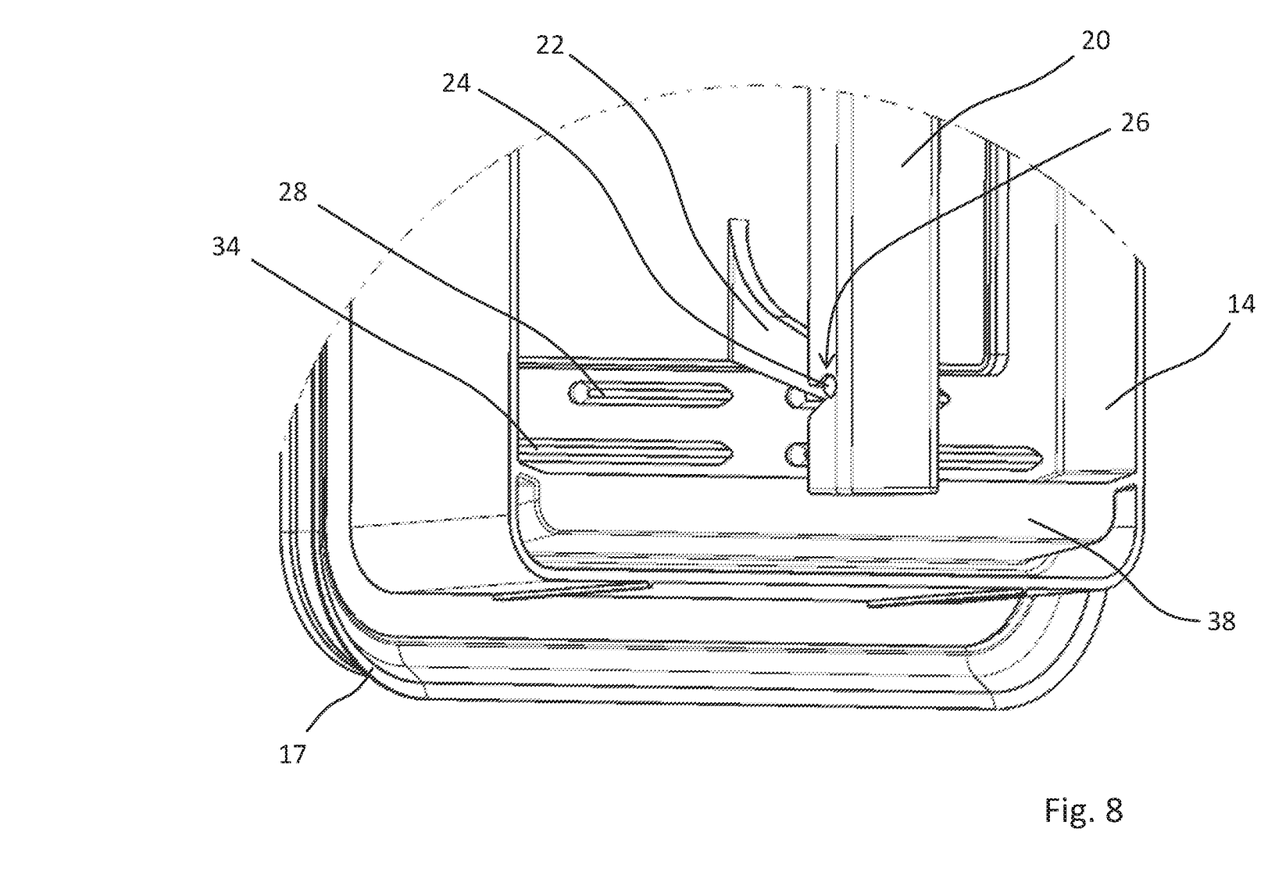
FIG. 8 shows a detailed view of the ventilation valve from FIG. 1 in a rear view.
Figure 9:
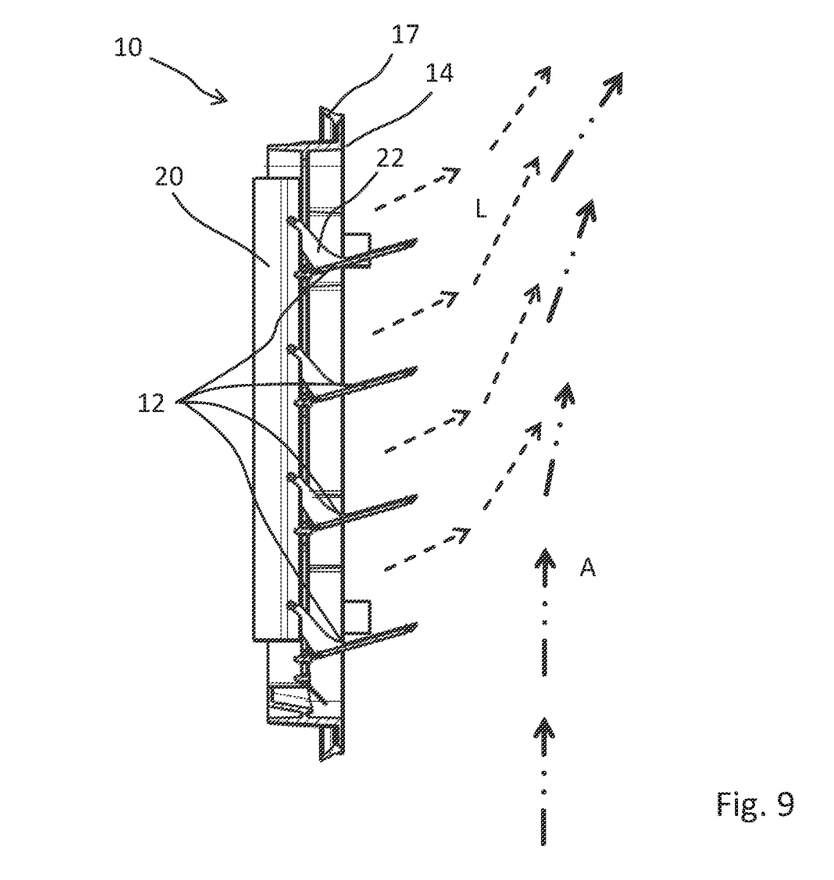
FIG. 9 shows the illustration from FIG. 6 together with an exhaust gas flow.

A counterweight which interacts with the four ventilation flaps 18 is identified by reference sign 20. The ventilation flaps 18 here each have a pivot arm 22 which in each case extends through the through openings 16 of the valve frame 14 and has a pin 24 which is in engagement with a pin receptacle 26 of the counterweight 20. This can be seen in particular in FIG. 7, wherein, for the sake of clarity, not all components are completely provided with reference signs. During opening of the ventilation flap 10, the ventilation flaps 18 pivot into their open position. The ventilation flaps 18 carry along the counterweight 20 therewith via the pivot arms 22, as can be seen in particular in FIGS. 4 and 6. The counterweight 20 is moved here upward along the axis of movement B counter to gravity, which acts downward in the figures. In the state of the ventilation flap 10 mounted in the vehicle, such a movement of the ventilation flaps 18 is achieved by a positive pressure prevailing in the vehicle interior. The air pressure in the vehicle interior is of such a size here that the weight force of the counterweight is overcome. An airflow L can thereby flow outward out of the vehicle interior. As indicated in FIG. 6 by the dashed lines, the airflow L leaves the through openings 16 obliquely upward because of the opening angle of the ventilation flaps 18. An exhaust gas flow A (chain-dotted lines in FIG. 9) which comes from an exhaust of the vehicle and likewise rises upward, is therefore carried along by the airflow L, as can be seen in FIG. 9. As the air pressure in the vehicle interior decreases, the force exerted on the ventilation flaps 18 by the airflow drops, with the ventilation flaps 18 being moved back into their closed position by the counterweight 20 as soon as the weight force of the counterweight 20 exceeds the force exerted by the airflow. The counterweight 20 serves here as a passive resetting means which pivots the ventilation flaps 18 back into the closed position.

On account of the counterweight 20, the ventilation valve 10 can be installed in a multiplicity of installed positions in the vehicle, wherein the ventilation flaps can open in particular also in the direction of gravity. This is possible since the counterweight also permits the ventilation flaps to be set back into the closed position counter to gravity. The counterweight moves the ventilation flaps here into the closed position without elastic deformation. The ventilation flaps can in particular have a greater rigidity than deformable valve flaps known from the prior art. Since a movement of the ventilation flaps is possible without deformation, fewer material fatigue phenomena occur, which leads to a longer service life and to greater tightness of the ventilation valve.

Furthermore, the refinement of the invention in FIGS. 1 to 8 shows a drainage flap 32 which is arranged at a lower end of the ventilation valve 10. The drainage flap 32 is mounted on a pivot bearing receptacle 36 of the lowermost web 19 via a pivot mounting 34. The drainage flap 32 serves for removing liquid, in particular water, which has passed into the vehicle interior, for example, through the open ventilation flaps. Said water accumulates in a collecting container 38 at the lower end of the ventilation valve 10 and pushes the drainage flap 32 outward as soon as water has sufficiently accumulated, as can be seen, for example, in FIG. 6. In contrast to the ventilation flaps 18, the drainage flap 32 is mounted here in such a manner that it opens counter to gravity and, after letting out the water which is accumulated in the collecting container 38, closes again in a gravity-induced manner.

Features of the invention include features A-N as follows:

A. A ventilation valve for ventilating the interior of a vehicle, comprising a valve frame (14) with at least one through opening (16), and also at least one ventilation flap (18) which is mounted on the valve frame (14) and is pivotable between a closed position and an open position, wherein the at least one ventilation flap (18) closes the at least one through opening (16) in the closed position and opens up the at least one through opening in the open position, which comprises resetting means (20) for pivoting the at least one ventilation flap (18) back out of the open position into the closed position.

B. The ventilation valve per A, wherein the resetting means (20) are designed to pivot the at least one ventilation flap (18) back into the closed position without elastic deformation.

C. The ventilation valve of A or B, wherein the resetting means comprise a counterweight (20) for the gravity-induced pivoting of the at least one ventilation flap (18) back into the closed position.

D. The ventilation valve of any of A-C, wherein the resetting means comprise a spring for the spring-force-induced pivoting of the at least one ventilation flap (18) back into the closed position.

E. The ventilation valve of any of A-D, wherein the resetting means comprise a drive which is designed to pivot the at least one ventilation flap (18) back into the closed position.

F. The ventilation valve of any of A-E, wherein the resetting means comprise a drive which is designed to pivot the at least one ventilation flap (18) into the open position.

G. The ventilation valve of E or F, wherein the drive is designed to pivot the at least one ventilation flap (18) in a manner depending on an operating parameter of the vehicle, for example in a manner depending on an air pressure prevailing in the vehicle interior.

H. The ventilation valve of any of A-G, wherein the at least one ventilation flap (18) has a flap body (18.1) and a sealing edge (18.2) surrounding the flap body (18.1), wherein the flap body (18.1) has a greater rigidity than the sealing edge (18.2).

I. The ventilation valve of H, wherein the at least one ventilation flap (18) is produced in a two-component injection molding process, wherein the flap body (18.1) is composed of a harder material than the sealing edge (18.2).

J. The ventilation valve of H, wherein the at least one ventilation flap (18) is produced in a one-component injection molding process, wherein the sealing edge (18.2) has a smaller material thickness than the flap body (18.1), and/or wherein the sealing edge (18.2) has a geometrical shape reducing the rigidity.

K. The ventilation valve of any of A-J, wherein the at least one ventilation flap (18) is provided with acoustic insulating material.

L. The ventilation valve of any of A-K, wherein the at least one ventilation flap (18) is composed of a foamed material.

M. A vehicle with a ventilation valve according to any of A-L, wherein the at least one ventilation flap (18) is mounted pivotably on the valve frame (14) in such a manner that, in an installed state of the ventilation valve (10) in the vehicle, the at least one ventilation flap (18) opens in the direction of gravity and closes counter to the direction of gravity.

N. The vehicle of M, which comprises at least one pressure sensor for measuring an air pressure prevailing in a vehicle interior, wherein the ventilation valve (10) comprises a drive which is designed to pivot the at least one ventilation flap (18) into the open position and/or into the closed position in a manner depending on the air pressure.

LIST OF REFERENCE SIGNS

10 Ventilation valves
12 Mounting plate
14 Valve frame
15 Latching projections
16 Through openings
17 Contact edge
18 Ventilation flaps
18.1 Flap body
18.2 Sealing edge
19 Webs
20 Counterweight
22 Pivot arms
24 Pin
26 Pin receptacles
28 Pivot mountings
30 Pivoting mounting receptacles
32 Drainage flap
34 Pivot mounting
36 Pivot bearing receptacle
38 Collecting container
A Exhaust gas flow
B Axis of movement
L Airflow

What is claimed is:

1. A ventilation valve for ventilating an interior of a vehicle, comprising a valve frame with an interior side, an exterior side, a plurality of through openings, a plurality of ventilation flaps, each ventilation flap mounted on the valve frame and pivotable between a closed position to block flow through a respective one of the openings and an open position to allow flow from the interior side to the exterior side through the respective one of the openings, and resetting means for pivoting each ventilation flap back out of the open position into the closed position, wherein the resetting means comprise a counterweight located at the interior side of the valve frame for gravity-induced application of a closing force for pivoting of each ventilation flap back into the closed position, wherein each ventilation flap comprises a flap body and a pivot arm that extends from the flap body through the respective one of the openings, wherein each pivot arm is pivotably connected to the counterweight, wherein, upon occurrence of a positive air pressure at the interior side which applies an opening force on the ventilation flaps that is sufficient to overcome the closing force of the counterweight, each ventilation flap moves from the closed position to the open position, and, as the positive air pressure at the interior side decreases, the opening force drops below the closing force applied by the counterweight, and each ventilation flaps moves back into the closed position, wherein each ventilation flap has a pivot connection on a lower edge of the flap body for connection to the valve frame.

2. The ventilation valve of claim 1,
wherein the counterweight includes a plurality of pin receptacles;
wherein each pivot arm has a pin that is in engagement with a respective one of the pin receptacles.

3. The ventilation valve as claimed in claim 1, wherein, for each ventilation flap, the pivot arm extends from a lower portion of the flap body.

4. The ventilation valve as claimed in claim 1, wherein each ventilation flap has a sealing edge surrounding the flap body and the flap body has a greater rigidity than the sealing edge.

5. The ventilation valve as claimed in claim 4, wherein each ventilation flap is produced in a two-component injection molding process, wherein the flap body is composed of a harder material than the sealing edge.

6. The ventilation valve as claimed in claim 4, wherein each ventilation flap is produced in a one-component injection molding process, wherein a rigidity of the sealing edge is lower than a rigidity of the flap body as a result of (i) the sealing edge having a material thickness that is smaller than a material thickness of the flap body and/or (ii) the sealing edge having a particular geometrical shape.

7. The ventilation valve as claimed in claim 1, wherein each ventilation flap is provided with acoustic insulating material.

8. The ventilation valve as claimed in claim 1, wherein each ventilation flap is composed of a foamed material.

9. A vehicle with a ventilation valve as claimed in claim 1.

\* \* \* \* \*